(12) United States Patent
Slocum et al.

(10) Patent No.: US 11,986,877 B1
(45) Date of Patent: May 21, 2024

(54) ACTIVATED ALUMINUM FORMATION

(71) Applicant: LTAG SYSTEMS LLC, Bow, NH (US)

(72) Inventors: Jonathan T. Slocum, Bow, NH (US); Alexander H. Slocum, Bow, NH (US)

(73) Assignee: LTAG SYSTEMS LLC, Bow, NH (US)

( * ) Notice: Subject to any disclaimer, the term of this patent is extended or adjusted under 35 U.S.C. 154(b) by 525 days.

(21) Appl. No.: 17/118,335

(22) Filed: Dec. 10, 2020

Related U.S. Application Data

(60) Provisional application No. 62/945,962, filed on Dec. 10, 2019, provisional application No. 62/985,919,
(Continued)

(51) Int. Cl.
| | |
|---|---|
| *B21F 15/04* | (2006.01) |
| *B21C 1/00* | (2006.01) |
| *B21C 37/04* | (2006.01) |
| *C21D 8/02* | (2006.01) |
| *D04C 1/12* | (2006.01) |

(Continued)

(52) U.S. Cl.
CPC ............ *B21F 15/04* (2013.01); *B21C 1/00* (2013.01); *B21C 37/045* (2013.01); *C21D 8/0236* (2013.01); *D04C 1/12* (2013.01); *B21C 23/24* (2013.01); *B21C 37/042* (2013.01); *B21J 1/02* (2013.01); *C23C 2/38* (2013.01); *C23C 4/16* (2013.01); *D10B 2101/20* (2013.01)

(58) Field of Classification Search
CPC ..... B21C 23/24; B21C 37/042; B21C 37/045; B21F 15/04; C23C 2/38; C23C 4/16; B21J 1/02
See application file for complete search history.

(56) References Cited

U.S. PATENT DOCUMENTS

| | | |
|---|---|---|
| 2,384,720 A | 9/1945 | Babcock et al. |
| 3,204,320 A | 9/1965 | Eckstein et al. |

(Continued)

FOREIGN PATENT DOCUMENTS

| | | |
|---|---|---|
| CN | 104289645 A | 1/2015 |
| CN | 109678109 A | 4/2019 |

(Continued)

OTHER PUBLICATIONS

U.S. Appl. No. 17/134,757 Non-Final Office Action dated Nov. 26, 2021; 20 pages.
(Continued)

*Primary Examiner* — Jermie E Cozart
(74) *Attorney, Agent, or Firm* — THE MARBURY LAW GROUP, PLLC

(57) ABSTRACT

A composite object for the production of hydrogen from water-reactive aluminum may include a first portion including an aluminum alloy having a non-recrystallized grain structure, and a second portion including an activation metal corrodible to the aluminum alloy, wherein the second portion and the first portion are coupled to one another with the activation metal of the second portion in contact with the aluminum alloy of the first portion at a plurality of points of contact stress, and the activation metal of the second portion is penetrable into the non-recrystallized grain structure of the aluminum alloy of the first portion via the addition of heat.

15 Claims, 9 Drawing Sheets

Related U.S. Application Data filed on Mar. 6, 2020, provisional application No. 63/016,955, filed on Apr. 28, 2020, provisional application No. 63/063,410, filed on Aug. 9, 2020.

(51) Int. Cl.
  B21C 23/24    (2006.01)
  B21J 1/02     (2006.01)
  C23C 2/38     (2006.01)
  C23C 4/16     (2016.01)

(56) References Cited

U.S. PATENT DOCUMENTS

| | | |
|---|---|---|
| 3,225,508 A | 12/1965 | Simon |
| 3,878,081 A | 4/1975 | Reding et al. |
| 3,993,595 A | 11/1976 | Merkl |
| 4,358,291 A | 11/1982 | Cuomo et al. |
| 4,770,848 A | 9/1988 | Ghosh et al. |
| 5,372,617 A | 12/1994 | Kerrebrock et al. |
| 5,481,788 A | 1/1996 | Simon et al. |
| 5,494,538 A | 2/1996 | Kirillov et al. |
| 5,620,652 A | 4/1997 | Tack et al. |
| 6,389,942 B1 | 5/2002 | Matsumoto et al. |
| 6,506,360 B1 | 1/2003 | Andersen et al. |
| 7,803,349 B1 | 9/2010 | Muradov |
| 8,418,435 B2 | 4/2013 | Hatoum |
| 8,974,765 B2 | 3/2015 | Boyle et al. |
| 9,624,103 B1 | 4/2017 | Woodall et al. |
| 10,258,950 B2 | 4/2019 | Kmetich et al. |
| 10,745,789 B2 | 8/2020 | Slocum |
| 11,111,141 B1 | 9/2021 | Slocum et al. |
| 11,148,840 B1 | 10/2021 | Slocum et al. |
| 11,148,947 B1 | 10/2021 | Slocum et al. |
| 11,661,339 B1 | 5/2023 | Mahar et al. |
| 2001/0054459 A1 | 12/2001 | Hostetler |
| 2002/0088178 A1 | 7/2002 | Davis |
| 2003/0024323 A1 | 2/2003 | Wang et al. |
| 2007/0181224 A1* | 8/2007 | Marya .......... C22C 21/003 148/420 |
| 2007/0217972 A1 | 9/2007 | Greenberg et al. |
| 2008/0063597 A1 | 3/2008 | Woodall et al. |
| 2008/0193806 A1 | 8/2008 | Kulakov |
| 2009/0208404 A1 | 8/2009 | Itoh |
| 2010/0028255 A1 | 2/2010 | Hatoum |
| 2010/0061923 A1 | 3/2010 | Reddy |
| 2012/0052001 A1 | 3/2012 | Woodall et al. |
| 2012/0107228 A1 | 5/2012 | Ishida et al. |
| 2012/0318660 A1 | 12/2012 | Cohly et al. |
| 2014/0231281 A1 | 8/2014 | Young et al. |
| 2014/0261132 A1 | 9/2014 | Zeren et al. |
| 2016/0355918 A1 | 12/2016 | Slocum |
| 2019/0024216 A1 | 1/2019 | Giri et al. |
| 2019/0193913 A1 | 6/2019 | Takehara |
| 2019/0341637 A1 | 11/2019 | Fine et al. |
| 2020/0199727 A1 | 6/2020 | Slocum et al. |
| 2020/0199728 A1 | 6/2020 | Slocum et al. |
| 2020/0325045 A1 | 10/2020 | Fukuoka |
| 2021/0061488 A1 | 3/2021 | Smithers et al. |
| 2021/0115547 A1 | 4/2021 | Slocum |
| 2021/0276865 A1 | 9/2021 | Meroueh |
| 2021/0276866 A1 | 9/2021 | Meroueh |
| 2022/0074023 A1 | 3/2022 | Godart |

FOREIGN PATENT DOCUMENTS

| | | |
|---|---|---|
| CN | 112935147 A | 6/2021 |
| JP | 2004174301 A | 6/2004 |
| JP | 2004243151 A | 9/2004 |
| RU | 2131841 C1 | 6/1999 |
| WO | 2009/034479 A2 | 3/2009 |
| WO | 2012110136 A1 | 8/2012 |
| WO | 2015005921 A1 | 1/2015 |
| WO | 20150077225 A1 | 5/2015 |
| WO | 2016196718 A1 | 12/2016 |

OTHER PUBLICATIONS

U.S. Appl. No. 17/499,264 Non-Final Office Action dated Dec. 9, 2021; 25 pages.
U.S. Appl. No. 16/804,643, Non-Final Office Action dated Apr. 15, 2021, 22 pages.
U.S. Appl. No. 15/171,053, Non-Final Office Action dated Sep. 19, 2019, 28 pages.
U.S. Appl. No. 16/804,643; Notice of Allowance dated Jan. 30, 2023; 16 pages.
U.S. Appl. No. 17/134,757; Final Office Action dated Jun. 30, 2022; 16 pages.
U.S. Appl. No. 17/499,264; Final Office Action dated Jul. 14, 2022; 17 pages.
U.S. Appl. No. 17/487,865; Notice of Allowance dated Feb. 3, 2023; 30 pages.
U.S. Appl. No. 17/730,475; Non Final Office Action dated Sep. 1, 2022; 36 pages.
WIPO; PCT/US2021/037948; Written Opinion and International Preliminary Report on Patentability dated Feb. 23, 2023; 8 pages.
PCT International Search Report and Written Opinion of the International Searching Authority; International Application No. PCT/US2021/037948; dated Nov. 5, 2021; 28 pages.
U.S. Appl. No. 17/351,079, Notice of Allowance dated Apr. 5, 2022; 25 pages.
U.S. Appl. No. 17/134,757, Final Office Action of Jun. 30, 2022; 16 pages.
Metals Handbook Tenth Edition, "vol. 2, Properties and Selection: Nonferrous Alloys and Special-Purpose Materials", Oct. 1990, pp. 145-146.
Rajagopalan, M. et al., "Atomic-scale analysis of liquid-gallium embrittlement of aluminum grain boundaries", Acta Materialia, vol. 73 Jul. 2014, pp. 312-325.
Choi, Go et al., "Mechanism of Hydrogen Generation via Water Reaction with Aluminum Alloys", Generating hydrogen on demand Jun. 28, 2010, 4 pages.
Parmuzina, A.V. et al., "Oxidation of activated aluminum with water as a method for hydrogen generation", Russian Chemical Bulletin, International Edition, vol. 58, No. 3 Mar. 2009 , pp. 493-989.
Vitos, L. et al., "The Surface Energy of Metals", Elsevier Surface Science 411, 1998 , pp. 186-202.
"Fundamentals of Adhesion edited by Lieng-Huang Lee", Xerox Corporation, 1991 , pp. 333-336.
Ansara, I. et al., "Thermodynamic Analysis of the Ga—In, Al—GA, Al—In and the Al—Ga—In Systems", Calphad vol. 2, No. 3 1978 , pp. 187-196.
EPO, "EP Application Serial No. 16804381.8, Extended European Search Report dated Oct. 26, 2018", 7 pages.
WIPO, "PCT Application No. PCT/US16/35397, International Preliminary Report on Patentability dated Dec. 5, 2017", 11 pages.
ISA, "PCT Application No. PCT/US16/35397, International Search Report and Written Opinion dated Sep. 7, 2016", 13 pages.
B. Wan et al., "Review of solid state recycling of aluminum chips", Elsevier, Resources, Conservation & Recycling 125 (2017) pp. 37-47.
Chao et al., "Mazimized On-Demand Hydrogen Genertor Design", Adv. Mat. Res. V 690-693. pp 954-961 (2013).
U.S. Appl. No. 17/351,079, Non-Final Office Action dated Nov. 8, 2021, 24 pages.
Lauren Meroueh "Effects of Doping and Microstructural Variables on Hydrogen Generated via Aluminum-Water Reactions Enabled by a Liquid Metal", Massachusetts Institute of Technology (MIT), Department of Mechanical Engineering, Sep. 2020, 127 pages.
U.S. Patent and Trademark Office, "Non-Final Office Action," issued in related U.S. Appl. No. 15/171,053, dated Jun. 6, 2018 (19 pages).
U.S. Patent and Trademark Office, "Final Office Action," issued in related U.S. Appl. No. 15/171,053, dated Mar. 5, 2019 (27 pages).
U.S. Patent and Trademark Office, "Notice of Allowance and Issue Fee(s) Due," issued in related U.S. Appl. No. 15/171,053, dated Feb. 10, 2020 (12 pages).
U.S. Patent and Trademark Office, "Final Office Action," issued in related U.S. Appl. No. 16/804,643, dated Oct. 28, 2021 (14 pages).

(56) References Cited

OTHER PUBLICATIONS

U.S. Patent and Trademark Office, "Non-Final Office Action," issued in related U.S. Appl. No. 16/804,643, dated Jun. 9, 2022 (15 pages).
U.S. Patent and Trademark Office, "Non-Final Office Action," issued in related U.S. Appl. No. 16/804,676, dated Jul. 21, 2021 (17 pages).
U.S. Patent and Trademark Office, "Notice of Allowance and Issue Fee(s) Due," issued in related U.S. Appl. No. 16/804,676, dated Jan. 25, 2022 (25 pages).
U.S. Patent and Trademark Office, "Non-Final Office Action," issued in related U.S. Appl. No. 17/134,757, dated Apr. 1, 2021 (19 pages).
U.S. Patent and Trademark Office, "Final Office Action," issued in related U.S. Appl. No. 17/134,757, dated Aug. 13, 2021 (11 pages).
U.S. Patent and Trademark Office, "Notice of Allowance and Issue Fee(s) Due" issued in related U.S. Appl. No. 17/134,757, dated Mar. 3, 2023 (21 pages).
U.S. Patent and Trademark Office, "Notice of Allowance and Issue Fee(s) Due," issued in related U.S. Appl. No. 17/499,264, dated Mar. 8, 2023 (8 pages).
U.S. Patent and Trademark Office, "Notice of Allowance and Issue Fee(s) Due," issued in related U.S. Appl. No. 17/315,163, dated Jul. 20, 2021 (20 pages).
U.S. Patent and Trademark Office, "Notice of Allowance and Issue Fee(s) Due," issued in related U.S. Appl. No. 17/315,163, dated Sep. 2, 2021 (13 pages).
U.S. Patent and Trademark Office, "Notice of Allowance and Issue Fee(s) Due," issued in related U.S. Appl. No. 17/487,865, dated Mar. 14, 2023 (14 pages).
U.S. Patent and Trademark Office, "Notice of Allowance and Issue Fee(s) Due," issued in related U.S. Appl. No. 17/487,865, dated Jul. 12, 2023 (14 pages).
U.S. Patent and Trademark Office, "Restriction Requirement," issued in related U.S. Appl. No. 17/730,475 dated Jul. 6, 2022 (6 pages).
U.S. Patent and Trademark Office, "Final Office Action," issued in related U.S. Appl. No. 17/730,475, dated Mar. 31, 2023 (6 pages).
U.S. Patent and Trademark Office, "Notice of Allowance and Issue Fee(s) Due," issued in related U.S. Appl. No. 17/730,475, dated Apr. 19, 2023 (12 pages).
U.S. Patent and Trademark Office, "Notice of Allowance and Issue Fee(s) Due," issued in related U.S. Appl. No. 17/730,475, dated Aug. 3, 2023 (13 pages).
U.S. Patent and Trademark Office, "Restriction Requirement," issued in U.S. Appl. No. 17/888,421, dated Mar. 22, 2023 (6 pages).
U.S. Patent and Trademark Office, "Non-Final Office Action," issued in U.S. Appl. No. 17/888,421, dated Jul. 10, 2023 (40 pages).
U.S. Patent and Trademark Office, "Final Office Action," issued in U.S. Appl. No. 17/888,421, dated Feb. 7, 2024 (23 pages).
U.S. Patent and Trademark Office, "Restriction Requirement," issued in U.S. Appl. No. 18/386,591, dated Feb. 23, 2024 (8 pages).

* cited by examiner

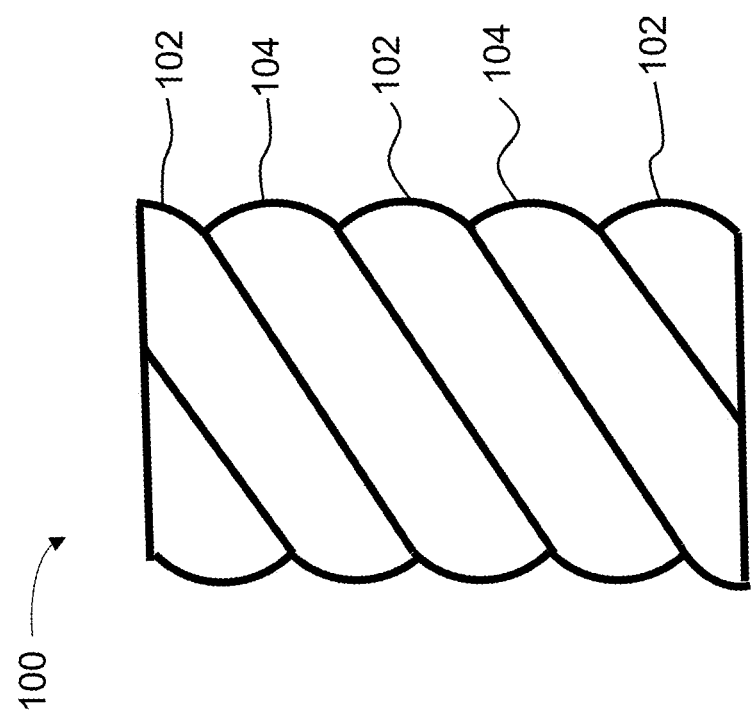
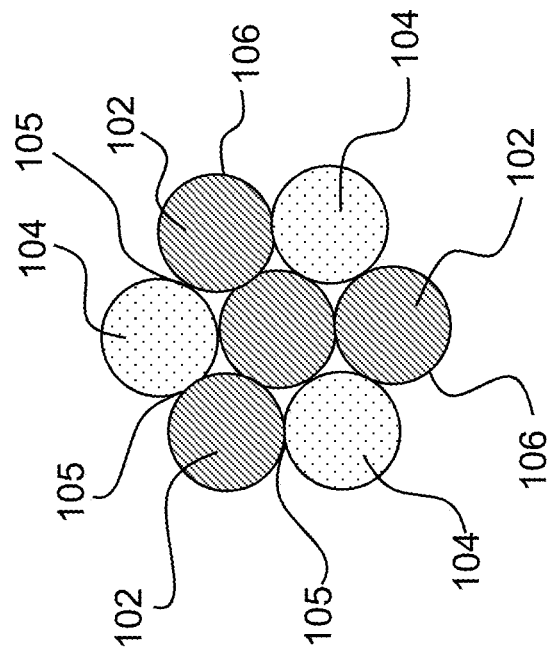
FIG. 1A
FIG. 1B

ACTIVATED ALUMINUM FORMATION

CROSS-REFERENCE TO RELATED APPLICATIONS

This application claims the benefit of priority to U.S. Provisional Patent Application No. 62/945,962, filed on Dec. 10, 2019, U.S. Provisional Patent Application No. 62/985,919, filed on Mar. 6, 2020, filed on U.S. Provisional Patent Application No. 63/016,955, filed on Apr. 28, 2020, and U.S. Provisional Patent Application No. 63/063,410, filed on Aug. 9, 2020, with the entire contents of each of these applications incorporated herein by reference.

BACKGROUND

Under normal environmental conditions, aluminum is covered with a protective oxide coating. This oxide coating forms rapidly in air and is stable. Thus, although aluminum itself can be reactive with water to produce hydrogen and heat, the oxide coating on aluminum is an obstacle to using aluminum as a source of energy.

To overcome the impact of aluminum oxide on the water-reactivity of aluminum, aluminum can be treated to be in an activated form that yields a large amount of hydrogen and heat when reacted with water. With this combination of energy density and water-reactivity, activated aluminum is a volumetrically efficient and useful source of hydrogen. However, materials used to form activated aluminum can be expensive. Further, given that it is subject to fouling by oxygen, water vapor, or other contaminants, activated aluminum can be challenging to handle and transport. Thus, collectively or individually, these issues can impact the cost-effectiveness and feasibility of using activated aluminum as a source of hydrogen for certain applications.

SUMMARY

According to one aspect, a composite object for the production of hydrogen from water-reactive aluminum may include a first portion including an aluminum alloy having a non-recrystallized grain structure, and a second portion including an activation metal corrodible to the aluminum alloy, wherein the second portion and the first portion are coupled to one another with the activation metal of the second portion in contact with the aluminum alloy of the first portion at a plurality of points of contact stress, and the activation metal of the second portion is penetrable into the non-recrystallized grain structure of the aluminum alloy of the first portion via the addition of heat and/or mechanical work.

In certain implementations, the aluminum alloy of the first portion may have at least about 20 percent plastic strain.

In some implementations, the aluminum alloy may include greater than zero percent and less than about 20 weight percent tin.

In certain implementations, the activation metal may be galvanically corrodible to the aluminum alloy. Additionally, or alternatively, the activation metal may include one or more of gallium or indium or zinc. For example, the activation metal may be a eutectic alloy of gallium and indium and/or zinc.

In some implementations, the composite object may further include a sacrificial metal having a higher current exchange density than the activation metal. For example, the sacrificial metal may be in one or more of the first portion or the second portion. The sacrificial metal may include zinc.

As an example, the aluminum alloy may include greater than zero percent and less than about two weight percent zinc.

In certain implementations, the first portion and the second portion may be coupled to one another in a cold-extrudable, twisted, braided, or wire wool configuration.

In some implementations, at least one of the first portion or the second portion includes iron, copper, or a combination thereof.

According to another aspect, a method of processing material for forming activated aluminum reactable with water to produce hydrogen may include positioning a first article in contact with a second article, the first article including an aluminum alloy, the second article including an activation metal, and the aluminum alloy is corrodible by the activation metal, and cold-working the first article and the second article together with one another to form a composite object including the aluminum alloy in a first portion and the activation metal in a second portion, wherein the activation metal of the second portion is energizable to penetrate into a non-recrystallized grain structure of the aluminum alloy of the first portion.

In some implementations, cold-working the first article and the second article together with one another may form at least about 20 percent plastic strain in the aluminum alloy of the first portion of the composite object.

In certain implementations, cold-working the first article and the second article together may include moving the first article and the second article together through an extruder. Additionally, or alternatively, cold-working the first article and the second article together may include cold rolling, forging, swaging, torsional winding, or a combination thereof.

In some implementations, the first article may be a first filament and the second article may be a second filament, and cold-working the first article and the second article includes forming the composite object as one or more of a twist, a braid, or wire wool including the first filament and the second filament.

In certain implementations, the method may further include energizing the composite object to penetrate at least a portion of the activation metal from the second portion of the composite object into a grain structure of the aluminum alloy in the first portion of the composite object to form activated aluminum. For example, energizing the object may include heating the composite object to a temperature greater than a melt temperature of the activation metal in the second portion of the composite object and below a recrystallization temperature of the aluminum alloy in the first portion of the composite object.

BRIEF DESCRIPTION OF THE FIGURES

FIG. 1A is a side view of composite object including a first portion and a second portion in contact with one another at a plurality of points of contact stress.

FIG. 1B is an end view the composite object of FIG. 1A.

Like reference symbols in the various drawings indicate like elements.

DETAILED DESCRIPTION

Figure 2:
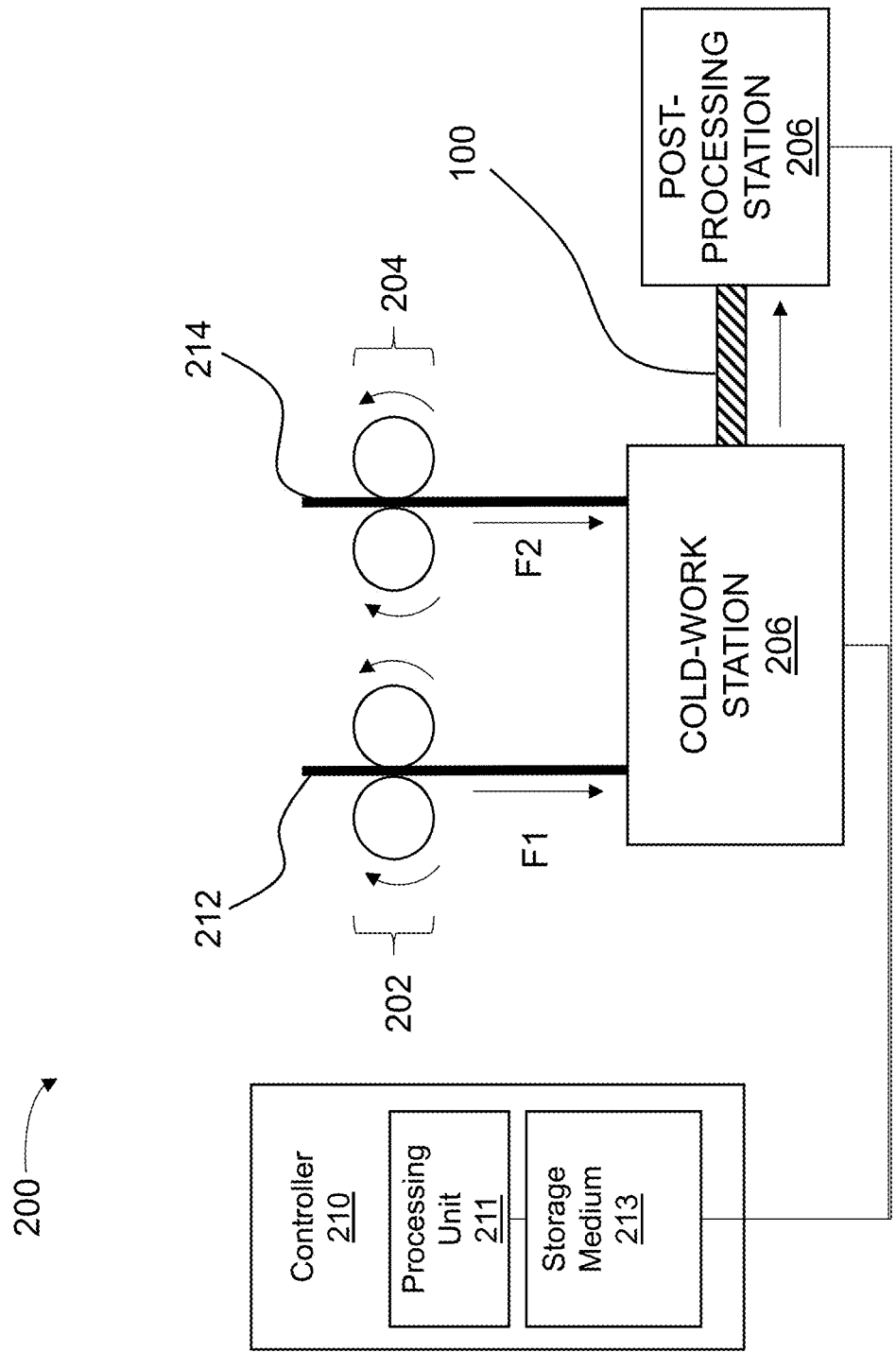
FIG. 2 is a schematic representation of a system for processing material for forming the composite structure of FIG. 1A, which is energizable to form activated aluminum reactable with water to form hydrogen.

The embodiments will now be described more fully hereinafter with reference to the accompanying figures, in which exemplary embodiments are shown. The foregoing may, however, be embodied in many different forms and should not be construed as limited to the exemplary embodiments set forth herein.

All documents mentioned herein are hereby incorporated by reference in their entirety. References to items in the singular should be understood to include items in the plural, and vice versa, unless explicitly stated otherwise or clear from the text. Grammatical conjunctions are intended to express any and all disjunctive and conjunctive combinations of conjoined clauses, sentences, words, and the like, unless otherwise stated or clear from the context. Thus, the term "or" should generally be understood to mean "and/or," and the term "and" should generally be understood to mean "and/or."

Recitation of ranges of values herein are not intended to be limiting, referring instead individually to any and all values falling within the range, unless otherwise indicated herein, and each separate value within such a range is incorporated into the specification as if it were individually recited herein. The words "about," "approximately," or the like, when accompanying a numerical value, are to be construed as including any deviation as would be appreciated by one of ordinary skill in the art to operate satisfactorily for an intended purpose. Ranges of values and/or numeric values are provided herein as examples only, and do not constitute a limitation on the scope of the described embodiments. The use of any and all examples or exemplary language ("e.g.," "such as," or the like) is intended merely to better illuminate the embodiments and does not pose a limitation on the scope of those embodiments. No language in the specification should be construed as indicating any unclaimed element as essential to the practice of the disclosed embodiments.

Using activated aluminum as a source of hydrogen and heat can present challenges with respect to the cost and robustness of the supply chain used to produce the activated aluminum and deliver it with little or no spoilage to the location to where it is to be used. Accordingly, in the description that follows, various aspects of processing materials for activated aluminum formation are described. For example, certain systems and methods described herein relate to formation of composite objects that facilitate long-term storage while being reliability activatable on-demand at or near the location and time of final use to form activated aluminum that may be reacted with water to form hydrogen. Additionally, or alternatively, some systems and methods described herein relate to processes that promote the efficient use of material for forming activated aluminum.

As used herein, the terms "activated aluminum," "aluminum in an activated form," and "water-reactive aluminum" shall be understood to be interchangeable with one another, unless otherwise specified or made clear from the context, with the different terms being used as appropriate to facilitate readability in different contexts. Further, unless a contrary intent is indicated, each of these terms shall be understood to include any manner and form of aluminum that may produce hydrogen upon exposure to water, with or without the addition of additional materials. Some examples of activated aluminum useable herein are set forth in U.S. Pat. No. 10,745,789, issued to Jonathan Thurston Slocum on Aug. 18, 2020, and entitled "Activated Aluminum Fuel," the entire contents of which are hereby incorporated herein.

Referring now to FIGS. 1A and 1B, a composite object 100 may include a first portion 102 and a second portion 104. The first portion 102 and the second portion 104 may be macroscopically identifiable. Additionally, or alternatively, the first portion 102 may include a cold worked non recrystallized aluminum alloy, and the second portion 104 may include an activation metal. The first portion 102 and the second portion 104 may be coupled to one another with the aluminum alloy of the first portion 102 in contact with the activation metal of the second portion 104 along a plurality of points of contact stress 105. As described in greater detail below, the arrangement of the first portion 102 and the second portion 104 of the composite object 100 may facilitate keeping these materials stable during long periods of storage. As also described in greater detail below, the arrangement of the first portion 102 and the second portion 104 may be energizable (e.g., through the addition of heat) to facilitate diffusing the second portion 104 into the first portion 102 at or near a location and time of use to form activated aluminum that, in turn, can be reacted with water to produce hydrogen on-site. That is, the need to store and handle activated aluminum over a range of conditions is generally in tension with its reactivity with water, as may be observed through premature degradation of activated aluminum in humid conditions. In addition, activated aluminum may need to be carefully packed and shipped by licensed carrier because there may be concern of a crash where the activated aluminum is spilled and exposed to water which may then result in the generation of significant amounts of hydrogen. Thus, as compared to activated aluminum, the composite object 100 advantageously decouples materials—the aluminum alloy and the activation metal—that are combinable to form activated aluminum while the decoupled arrangement of these materials in the composite object 100 is reliably formable into activated aluminum on-demand, with little or no specialized skill and under a variety of conditions.

In use, the composite object 100 may be heated to a temperature above the melt temperature of the activation metal in the second portion 104 and below the recrystallization temperature of the aluminum alloy in the first portion 102. At this temperature, the activation metal from the second portion 104 may diffuse into the aluminum alloy of the first portion 102 via surface disruptions along the outer surface 106 of the first portion 102. In particular, the outer surface 106 of the first portion 102 may include an aluminum oxide coating that is unreactive with water. The heated activation metal may corrode at least a portion of the aluminum oxide coating along the outer surface 106 of the first portion 102. Importantly, the activation metal of the second portion 104 may also diffuse into the first portion 102 to form activation metal-wetted grain boundaries. In certain instances, the composite object 100 may be aged (e.g., for about 48 hours) following the addition of heat to promote further penetration (e.g., diffusion) of the activation metal into the aluminum alloy and, thus, to promote further formation of activation metal-wetted grain boundaries. Without wishing to be bound by theory, it is believed that this may result in micro-galvanic cells formed between the aluminum grains (less noble metal) and the surrounding activation metal (more noble metal). As these cells come into contact with water to complete the circuit, water may be exposed to raw aluminum to produce hydrogen. It shall be appreciated, therefore, that the penetration (e.g., diffusion) of the activation metal into the aluminum alloy to be spatially distributed throughout the volume of the aluminum alloy in the first portion 102 may be advantageous for achieving a high yield of hydrogen from the amount of aluminum alloy reacted (e.g., greater than about 85 percent of theoretical yield)

In general, the aluminum alloy in the first portion 102 may have a non-recrystallized grain structure, which may facilitate penetration of the activation metal of the second portion 104 throughout the aluminum alloy of the first portion 102 through diffusion upon application of heat. As used herein, a non-recrystallized grain structure shall be understood to be a physical characteristic of material that has been plastically deformed according to any one or more of various different types of cold-working techniques (such as those described herein) and is alternatively referred to herein as "cold-worked", and has not subsequently been exposed to heat above the recrystallization temperature which would anneal the cold working. In the context of the aluminum alloy in the first portion 102, plastic deformation that occurs during cold working (e.g., at least about 20 percent plastic strain) can advantageously yield more surface cracks and initiation sites on an outer surface 106 of the first portion 102, where the activation metal in the second portion 104 may diffuse into the first portion 102 via the addition of energy such as heat. Further, the non-recrystallized grain structure of the aluminum alloy of the first portion 102 yields a greater distribution of dislocations and high-angle grain boundaries within the otherwise regular crystalline structure of the aluminum alloy of the first portion 102. Thus, for example, as the activation metal of the second portion 104 is heated, the greater distribution of dislocations and high-angle grain boundaries in the aluminum alloy may facilitate penetration of the activation metal into and through the interior of the bulk volume of the aluminum alloy of the first portion 102 during exposure.

The aluminum alloy may have misaligned grains and, thus, a high energy grain boundary (e.g., greater than about 0.5 J/m$^2$), such as a grain boundary characteristic of cold worked non recrystallized aluminum. Thus, importantly, the aluminum alloy in the first portion 102 of the composite object 100 may be sourced from scrap aluminum, a feature beneficial to the cost-effectiveness of forming the composite object 100 and to the cost-effectiveness ultimately formed from the composite object 100.

The aluminum alloy of the first portion 102 may be greater than about 80 percent, by mass, of the first portion 102. The remainder of the mass of the first portion can include impurities. In some cases, components that are ordinarily considered impurities in aluminum alloys may be particularly useful in the aluminum alloy in the first portion 102, thus further facilitating sourcing the aluminum alloy from scrap aluminum. As an example, the aluminum alloy in the first portion 102 may include up to about 20 weight percent of tin. Given that tin is more noble than aluminum, the inclusion of tin in the aluminum alloy may facilitate galvanic corrosion of the aluminum alloy as the composite object 100 is heated to diffuse the activation metal from the second portion 104 into the first portion 102. Further, or instead, the aluminum alloy of the first portion 102 may include up to about 2 weight percent of a sacrificial metal (e.g., zinc) having a higher current exchange density than the activation metal. Without wishing to be bound by theory, it is believed that such a sacrificial metal increases the current exchange density, which in turn aids in corrosion of aluminum when reacted with water, thus generating hydrogen from the water as the oxygen atoms bond with the aluminum. Thus, the inclusion of one or both of tin or a sacrificial metal such as zinc in the aluminum alloy may make the composite object 100 more robust with respect to forming high-yielding activated aluminum, even with less thorough diffusion of the activation metal into the aluminum alloy. While tin and/or a sacrificial metal such as zinc may be components of the aluminum alloy of the first portion 102 of the composite object 100, it shall be understood that tin and/or a sacrificial metal such as zinc may additionally, or alternatively, be included in the activation metal of the second portion 104 of the composite object 100.

In general, the activation metal of the second portion 104 may include any one or more of various different materials corrodible to the aluminum alloy of the first portion 102 of the composite object 100. As used in this context, "corrodible" shall be understood to include any manner and form of corrosion of aluminum of the aluminum alloy by the activation metal that may occur as the activation metal penetrates into the bulk volume of the aluminum alloy. Further, or instead, corrodible shall be understood to include any manner and form of corrosion of aluminum of the aluminum alloy by the activation metal that may occur with the addition of water. Thus, while the activation metal of the second portion 104 may be in contact with the aluminum alloy of the first portion 102 along the plurality of points of contact stress 105, the amount of corrosion of the aluminum alloy at the plurality of points of contact stress 105 may be insignificant in the absence of water (e.g., under dry ambient conditions), may result in compositional stability the composite object 100 until such time as the composite object 100 is energized (e.g., heated) to diffuse the activation metal of the second portion 104 into the aluminum alloy of the first portion 102. In certain instances, the activation metal may include a eutectic alloy (e.g., an alloy having a well-defined melting point) to facilitate controlling the distribution of the activation metal from the second portion 104 penetrating into the bulk volume of the aluminum alloy of the first portion 102 and, thus, controlling corrosion of the aluminum alloy by the activation metal.

As an example, the activation metal may be galvanically corrodible to the aluminum alloy. That is, the activation metal may include one or more components that are more noble than aluminum such that the activation metal and aluminum form a galvanic cell. While this results in a galvanic cell at the plurality of points of contact stress 105, the amount of galvanic corrosion occurring at such locations is minimal under dry storage conditions. Continuing with this example, the addition of water may complete the circuit and corrode the aluminum through galvanic corrosion. Some examples of materials activation metals include one or more of gallium, indium, tin, or zinc including eutectic alloys of two or more of these metals. Thus, for example, the activation metal may be a eutectic alloy of gallium and indium or gallium and zinc.

In certain implementations, at least one of the first portion 102 or the second portion 104 of the composite object 100 may include one or more materials that are less electronegative than aluminum. Such materials may facilitate, for example, reacting aluminum to completion in an aqueous solution that includes ions (e.g., saltwater). Examples of materials that may be used in this context include iron, copper, or a combination thereof. These metals may be particularly useful, given their stability and cost-effectiveness.

In general, the first portion 102 and the second portion 104 of the composite object 100 may be coupled to one another in any one or more of various different shapes in which the aluminum alloy of the first portion 102 and the activation metal of the second portion 104 are in contact with one another at least at the plurality of points of contact stress 105 (e.g., Hertzian contact stress). Unless otherwise specified or made clear from the context, it shall be understood that such shapes may be formed as part of cold-working the first portion 102 and the second portion 104 together according to any one or more of the various different techniques described herein. For example, through cold-working the first portion 102 and the second portion 104 together, the first portion 102 and the second portion 104 may be coupled to one another in any one or more of various different cold-extrudable, twisted, braided, or wire wool configurations. In the context of the foregoing, it shall be appreciated that a cold-extrudable configuration may include any shape having a fixed cross-sectional profile along a length of the shape. One of many examples of such a shape includes a cylinder having a fixed circular, square, or triangular cross-sectional profile in the axial direction.

The contact between the aluminum alloy and the activation metal at the plurality of points of contact stress 105 may facilitate robust penetration of the activation metal of the second portion 104 into the bulk volume of the aluminum alloy of the first portion 102. At the plurality of points of contact stress 105, microcracks are likely to extend through the outer surface 106 of the first portion 102 an into the bulk volume of the aluminum alloy. With the activation metal in contact with the aluminum alloy at the plurality of points of contact stress 105, such microcracks may form an efficient pathway for the penetration of the activation metal from the second portion 104 into the bulk volume of the aluminum alloy of the first portion 102.

Referring now to FIG. 2, a system 200 may form a composite object, such as the composite object 100. For example, the system 200 may include a first drive system 202, a second drive system 204, a cold-work station 206, and a post-processing station 208. In certain implementations, the system 200 may additionally, or alternatively, include a controller 210 in electrical communication with one or more of the first drive system 202, the second drive system 204, the cold-work station 206, or the post-processing station 208 to control various different aspects of fabrication of the composite object 100. For example, the controller 210 may include a processing unit 211 and non-transitory, computer-readable storage media 213. Unless otherwise specified or made clear from the context, the non-transitory, computer-readable storage media 213 may have stored thereon instructions for causing the processing unit 211 to cause one or more of the first drive system 202, the second drive system 204, the cold-work station 206, or the post-processing station 208 to carry out any one or more aspects of the techniques described herein. Further, or instead, it shall be appreciated that while the controller 210 is shown as a single controller, this is for the sake of clarity of illustration. Thus, unless a contrary intent is explicitly indicated, any one or more of various different aspects of control of one or more of the first drive system 202, the second drive system 204, the cold-work station 206, or the post-processing station 208 may be distributed, such as may be useful for controlling various components of the system 200 individually.

The first drive system 202 may be actuatable to move a first article 212 in a first feed direction F1 toward the cold-work station 206. The first article 212 may include any one or more of the various different types of aluminum alloys described herein. Thus, for example, the first article 212 may include scrap metal. Further, or instead, the first article 212 may be any one or more of various different shapes. As an example, the first article 212 may be a first filament, and the first drive system 202 may include a plurality of rollers drivable to move the first article 212 in the first feed direction F1 toward the cold-work station 206. Thus, returning to the example of the use of scrap metal, the first filament may be formed (e.g., by cold-working) the scrap metal a different initial shape into the shape of the first filament.

The second drive system 204 may be actuatable to move the second article 214 in a second feed direction F2 toward the cold-work station 206. The second article 214 may include an activation metal, such as any one or more of the various different activation metals described herein. Thus, it shall be appreciated that the aluminum alloy in the first article 212 may be corrodible by the activation metal of the second article 214. Further, or instead, the second article 214 may be any one or more of various different shapes. As an example, the second article 214 may be a second filament, and the second drive system 204 may include a plurality of rollers drivable to move the second article 214 in the second feed direction F2 toward the cold-work station 206.

As the first article 212 and the second article 214 move in the first feed direction F1 and the second feed direction F2, respectively, these articles may be positioned into contact with one another at or upstream of the cold-work station 206. In general, the cold-work station 206 may include any one or more of various different types of cold-working equipment useful for cold-working the first article 212 and the second article 214 together to form the composite object 100. For example, unless otherwise specified or made clear from the context, the cold-work station 206 may include any one or more of the various different types of equipment described herein. That is, even if such equipment is described in the context of cold-working a single article, it shall be understood that such cold-working equipment may be used to cold-work a plurality of articles (e.g., the first article 212 and the second article 214) together in the cold-work station 206 without departing from the scope of the present disclosure and, for the sake of clear and efficient description, each type of cold-work equipment described herein is not described separately with respect to use in the cold-work station 206.

At the cold-work station 206, the first article 212 and the second article 214 may be cold-worked together with one another to form the composite object 100. As used herein, cold-working shall be understood to include plastically deforming metals below the recrystallization temperature of such metals. Thus, for example, cold-working may be carried out at or near room temperature (e.g., about 70° C.). In certain implementations, cold-working the first article 212 and the second article 214 together with one another may form at least about 20 percent plastic strain in the aluminum alloy of the first portion 102 (FIG. 1A) of the composite object 100.

Further, or instead, returning to the examples in which the first article 212 is a first filament and the second article 214 is a second filament, cold-working the first article 212 and the second article 214 may include forming the composite object 100 as one or more of a twist or a braid. In such a configuration, there may be high contact stress between the first portion 102 (FIG. 1A) and the second portion 104 (FIG. 1A) of the composite object 100, such as may be obtainable by applying high tensile loads applied to the first article 212 and the second article 214, drawing the first article 212 and the second article 214 (e.g., by pulling these through a drawing die), or torsion applied to the first article 212 and/or the second article 214 individually or together. Continuing with this configuration, while the composite object 100 may be twisted together to form a helical shape similar to the formation of steel cable, the first article 212 and the second article 214 may be laid parallel to one another and woven together to form a braid or rope. Such a woven structure may be further cold-worked by processes such as cold-rolling, forging, and/or drawing. Further, while the formation of the composite object 100 has been described as including a first article 212 as a first filament and the second article as a second filament, it shall be appreciated that any number of instances of the first filament and/or the second filament may be cold-worked together, as may be useful for increasing the number of points of contact stress per unit volume of the composite object 100.

While the first article 212 and the second article 214 have been described as being filaments, it shall be appreciated that the first article 212 and the second article 214 may be any one or more of various different form factors as may be useful for forming the composite object 100 through cold-working the first article 212 and the second article 214 together. Thus, for example, the first article 212 may be a rod, and the second article 214 may be a coating applied (e.g., evenly) to the rod. That is, the coating may include one or more of gallium, indium, or tin, and cold-working the coated rod may force these activating metals into the grain boundaries of the aluminum alloy in the rod.

In certain implementations, cold-working the first article 212 and the second article 214 in the cold-work station 206 may include forming the compact object 100 as wire wool. For example, the first article 212 and the second article 214 may each include filaments that are cold-worked together to form the wire wool. Additionally, or alternatively, the first article 212 may be cold-worked in the cold-work station 206 to form the wire wool, and the second article 214 may be small pieces that are sprinkled on the wire wool formed from the first article 212 and/or the second article 214 may be sprayed (e.g., flame sprayed) on the wire wool of the first article 212. This combination of the first article 212 and the second article 214 may be sent through a rolling mill in the cold-work station 206 to make a compact, yet still porous wire wool matrix that may facilitate the inflow of water. That is, once the composite object 100 with this matrix form factor is energized to form activated aluminum, water may flow through the matrix of activated aluminum to facilitate efficient and rapid production of hydrogen. Continuing with this example, it shall be appreciated that the porosity of the composite object 100 and, thus, the rate of reaction of the resulting activated aluminum with water can be controlled by the number of times the first article 212 and the second article 214 are sent through the rolling mill.

Additionally, or alternatively, the first article 212 and the second article 214 may be cold-worked together in the cold-work station 206 in a process that includes twisting and intertwining the first article 212 and the second article 214 and sending this assembly repeatedly through a rolling mill, wherein between each send-through, the assembly is folded back onto itself to increase mixing, entanglement, and the high contact pressure between materials to facilitate low temperature diffusion of the activation metal into the aluminum alloy.

In instances, in which the first article 212 is the first filament, it shall be appreciated that the first filament may be formed according to any one or more of various different techniques. For example, an aluminum alloy (e.g., including tin or other activating metals) may be cast as a structure, such as a rod, that can be drawn through a series of dies in the cold-work station 206 to make the first filament with finer and finer diameters, until the diameter of the first filament is on the order of a fraction of a millimeter. The resulting first filament of the first article 212 may advantageously have a fine grain structure. This first filament may be further cold worked with the second article 214 to form the composite object 100. As another example, the first article 212 may include aluminum alloyed with activating elements, such as 10-20% tin or zinc, and melt spun to form an amorphous ribbon which has no grain structure. The amorphous ribbon may then be formed into the first filament by, for example, successively, drawing finer and finer strands from it.

For example, the cold-work station 206 may include an extruder, and cold-working the first article 212 and the second article 214 together may include moving the first article 212 and the second article 214 together through the extruder of the cold-work station 206 to form the composite object 100 through cold-extrusion. Additionally, or alternatively, cold-working the first article 212 and the second article 214 together in the cold-work station 206 may include cold rolling, forging, swaging, torsional winding (along a longitudinal axis or about an axis to form a coil), or a combination thereof.

At the post-processing station 208, any one or more of various different types of operations may be carried out on the composite object 100, such as operations carried out according to considerations related to packaging, end-use case, or the like. For example, in some instances, the composite object 100 may be spooled in the post-processing station 208, such as may be useful for applications requiring large amounts of activated aluminum formable from the composite object 100. Further, or instead, the composite object 100 may be cut into discrete pieces, formed into billets, or otherwise made into small pieces that may be useful, for example, for formation of hydrogen at a slower rate once activated to be reactable with water. Unless otherwise specified or made clear from the context, the post-processing station 208 may include any one or more of the various different types of equipment described herein. That is, even if such equipment is described in the context of processing aluminum by itself, it shall be understood that such post-processing equipment may be used to post-process the composite object 100 without departing from the scope of the present disclosure and, for the sake of clear and efficient description, each type of post-processing equipment described herein is not described separately with respect to use in the post-processing station 208.

In general, the composite object 100 may be energized to penetrate at least a portion of the activation metal from the second portion 104 (FIG. 1A) of the composite object 100 into a grain structure of the aluminum alloy in the first portion 102 (FIG. 1A) of the composite object 100 to form activated aluminum. For example, energizing may include heating the composite object 100 to a temperature greater than the melt temperature of the activation metal and below the recrystallization temperature of the aluminum alloy. Heating the composite object 100 may include, for example, directly heating the composite object 100, such as may be useful in many remote field applications without the availability in specialized equipment. Additionally, or alternatively, heating the composite object 100 may include indirectly heating the composite object 100 through the application of pressure and/or vibration, such as may be useful for addressing safety considerations of certain applications.

Having described various aspects of forming composite objects that may be stably stored and shipped while being reliably activatable in the field to form activated aluminum, attention is now directed to fabrication of aluminum in an activated form using one or more techniques that make efficient use of activation metal. That is, generally, activation metals such as gallium and indium are expensive. Accordingly, the efficient use of such activation metals in forming activated aluminum is generally useful for achieving cost-effectiveness of hydrogen production using activated aluminum as compared to production of hydrogen using other technologies. Unless otherwise specified or made clear from the context, any one or more of the following techniques may be used in combination with or in place of any one or more of various different aspects of the system 200 and/or of one another, and the various different possible combinations are not described separately for the sake of clear and efficient description. Thus, for example, the controller 210 of the system 200 may be used to control operation of any one or more of the various different systems described below.

Figure 3:
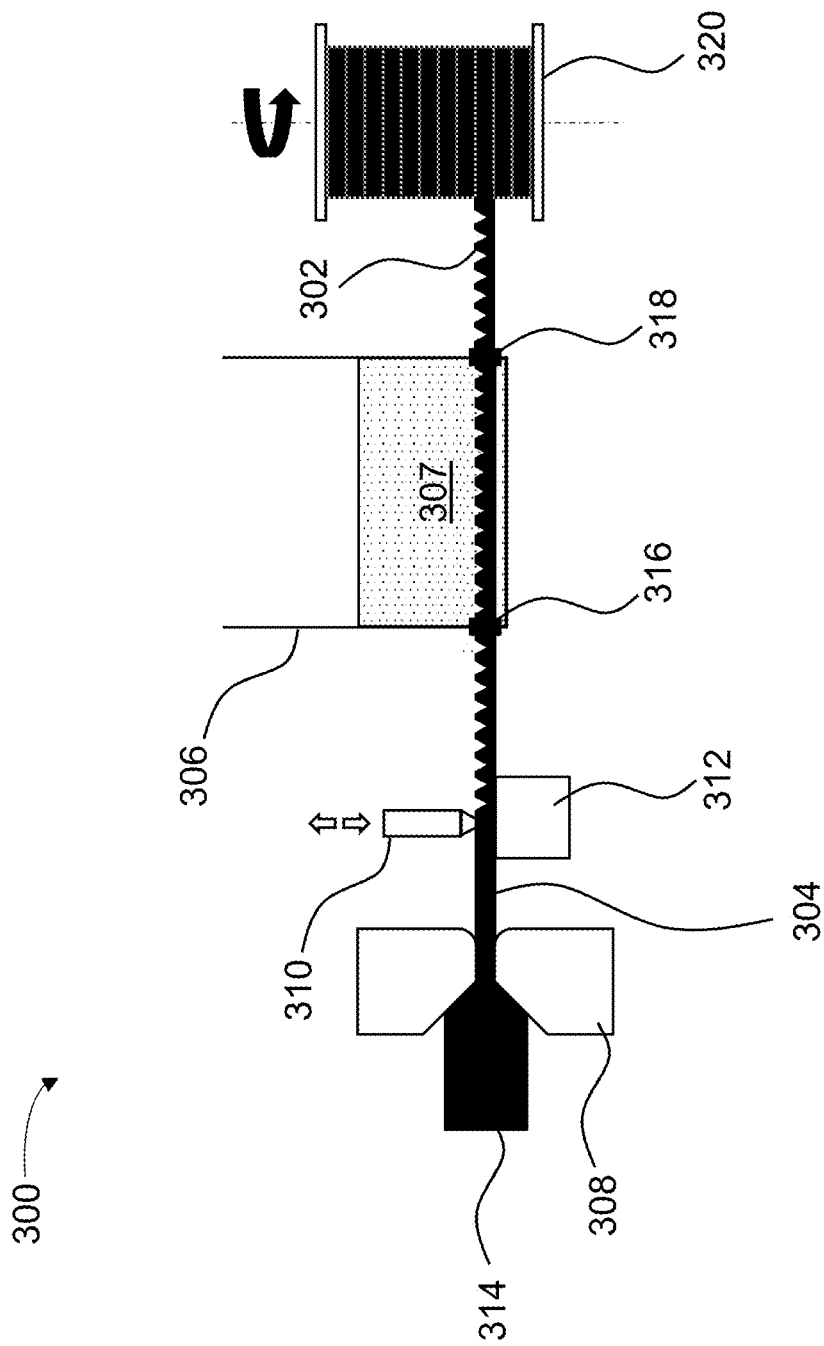
FIG. 3 is a schematic representation of a system for processing material for forming activated aluminum reactable with water to form hydrogen, the system including a blade and die for notching a feed wire.

Referring now to FIG. 3, a system 300 may continuously form an activated aluminum wire 302 by cold-working a feed wire 304 using, for example, rollers and/or an edge to bend, compress, and/or notch (which may include knurling) the wire prior to immersing a feed wire in a heated bath 306 of liquid activation metal 307 (e.g., gallium, indium, tin, zinc, or other transition metals) and/or while the feed wire 304 is immersed in the heated bath 306. Additionally, or alternatively, the liquid metal can be wetted onto the surface of the cold-worked aluminum via sputtering and/or spraying. As the aluminum metal of the feed wire 304 is cold-worked, the grain boundaries become stressed increasing their strain energy, and more dislocations and randomness is added to the metal matrix as a result of energy being put into the bulk material of the feed wire 304. This creates favorable conditions for liquid metal in the heated bath 306 to diffuse into the feed wire 304 along the grain boundaries to form the activated aluminum wire 302. While the system 300 may be operated under ambient conditions, it shall be appreciated that the system 300, or at least the heated bath 306, may be additionally or alternatively operated in a positive pressure inert-gas environment to reduce the likelihood of oxidation of oxidation of one or more of the metals used to form the activated aluminum wire 302. In turn, this may reduce the overall cost of manufacturing.

In some implementations, the system 300 may include a die 308, a blade 310, and an anvil 312. In such implementations, cold-working the feed wire 304 may include moving a feed stock 314 to form the feed wire 304. Additionally, or alternatively, the feed wire 304 may be notched between the blade 310 and the anvil 312 periodically. Continuing with this example, the feed wire 304 in notched form may be fed through a first seal 316 of the heated bath 306 and into the liquid activation metal 307, which may be a gallium-indium eutectic alloy. As the liquid activation metal 307 penetrates the feed wire 304 in the heated bath 306, the feed wire 304 may become the activated aluminum wire 302. The activated aluminum wire 302 may exit the heated bath 306 via a second seal 318, which may include a wiper blade, that removes residual amounts of the liquid activation metal 307 from the surface of the activated aluminum wire 302, such as may be useful for making efficient use of the liquid activation metal 307, which may be expensive.

The activated aluminum wire 302 (which is notched and coated) may move from the heated bath 306 to a spool 320, where the activated aluminum wire 302 may be spooled. The spool 320 may be spun to centrifugally remove excess amounts of the liquid activation metal 307 that may have wetted to the surface of the activated aluminum wire 302, such that the liquid activation metal 307 may be collected, cleaned, and reused for future treatments.

In certain instances, the activated aluminum wire 302 may be kept at a temperature of greater than about 70° C. and less than about 120° C. for 60 minutes and then aged for at least two days at room temperature to facilitate further penetration of the liquid activation metal 307 into the grain structure of the activated aluminum wire 302. Additionally, or alternatively, the spool 320 of the activated aluminum wire 302 may be packaged in an inert or vacuum environment to reduce the likelihood that the activated aluminum wire 302 may spoil via oxidation over time.

Figure 4:
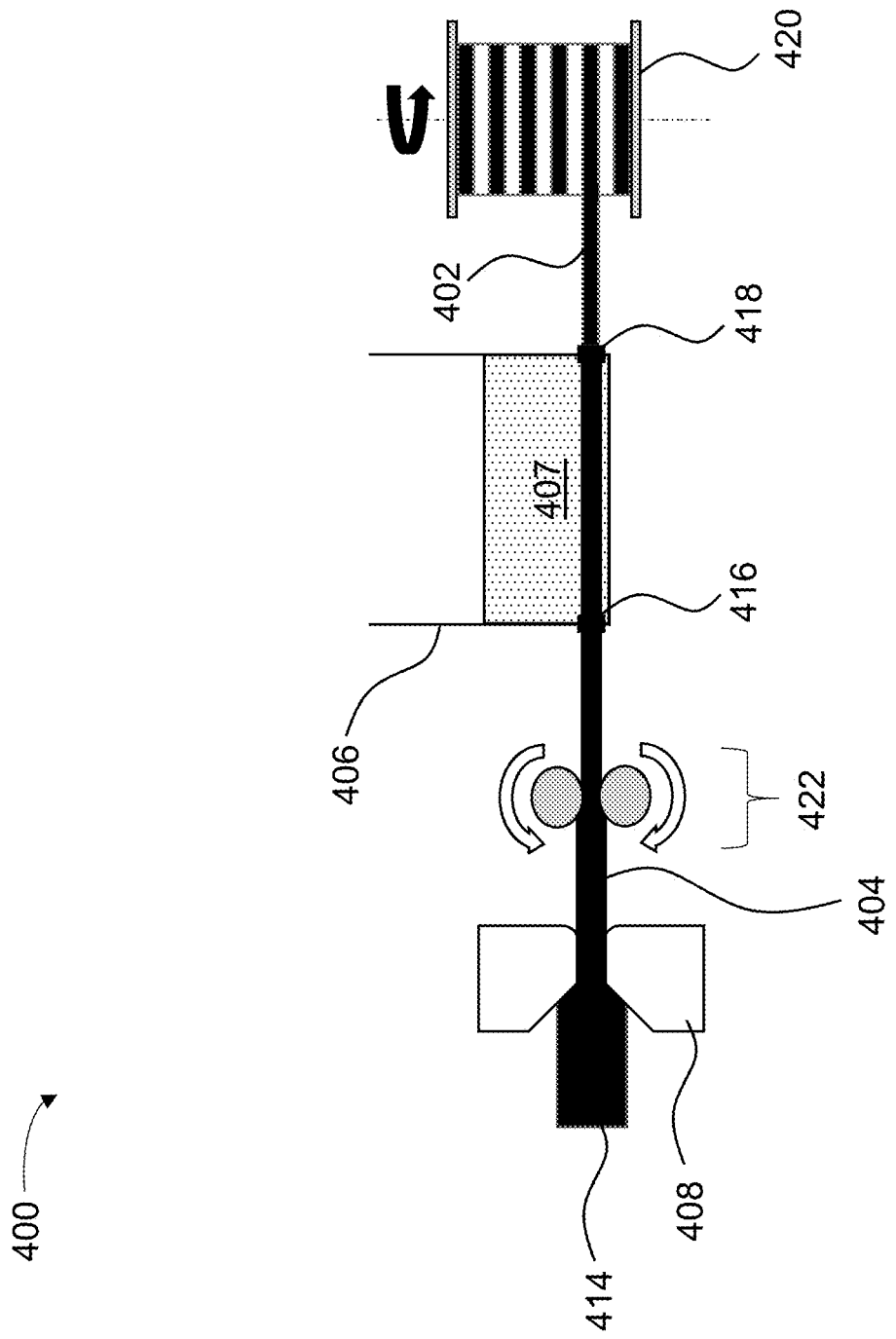
FIG. 4 is a schematic representation of a system for processing material for forming activated aluminum reactable with water to form hydrogen, the system including a rolling mill.

Referring now to FIG. 4, a system 400 may include a feed stock 414 movable through a die 408 to form a feed wire 404 analogous to the feed wire 304 (FIG. 3). The feed wire 404 may move through a rolling mill 422, where the feed wire 404 is cold-worked. With the feed wire 404 cold-worked in this way, the feed wire 404 may move into a heated bath 406, via a first seal 416. The heated bath 406 may contain a liquid activation metal 407 analogous to the liquid activation metal 307 (FIG. 3). The feed wire 404 may form an activated aluminum wire 402 in the heated bath 406, and the activated aluminum wire 402 may exit the heated bath 306 via a second seal 418, which may include a wiper useful for removing residual amount of the liquid activation metal 407 from the activated aluminum wire 402. The activated aluminum wire 402 may be spooled on the spool 420 and treated as discussed above with respect to the activated aluminum wire 302 (FIG. 3).

While cold-working and then treating an aluminum-containing feed wire with an activation metal has been described, it shall be appreciated that the aluminum-containing wire may be additionally, or alternatively, cold-worked while it is being treated with activation metal.

Figure 5A:
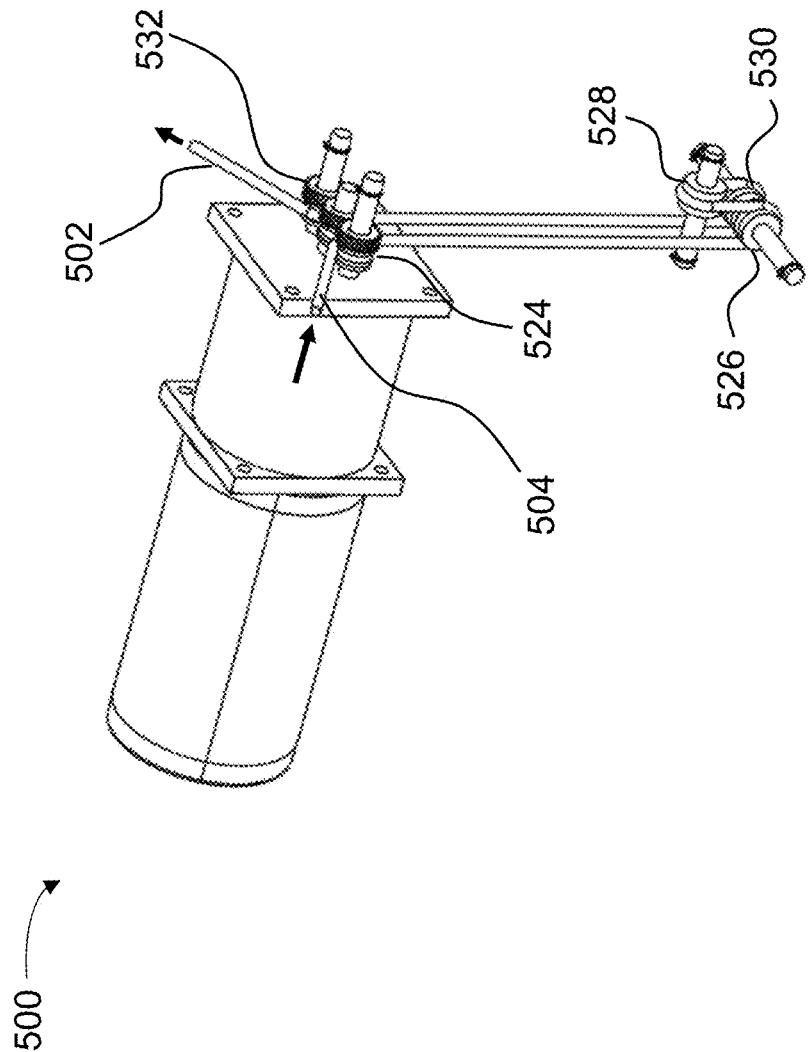
FIG. 5A is a perspective view of a system for processing material for forming activated aluminum reactable with water to form hydrogen, the system including rollers arranged to move a feed wire through orthogonal axes.
Figure 5B:
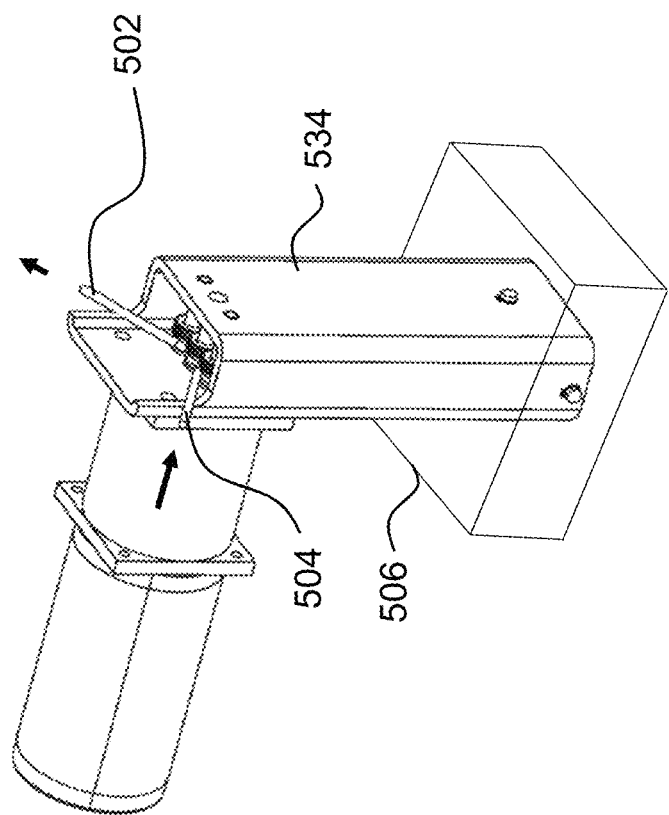
FIG. 5B is a perspective view of the system of FIG. 5A, with the rollers covered by a housing and positioned in a heated bath.

For example, referring now to FIGS. 5A and 5B, a system 500 may include a feed wire 504 moving along a feed path that includes moving through an input roller 524, which directs the feed wire 504 to a first roller 526, where the feed wire 504 moves through a first 180° bend and then moves to a second roller 528 defining an axis of rotation orthogonal to an axis of rotation defined by the first roller 526. The feed wire 504 moving over the second roller 528 may move through a second 180° bend before moving to a third roller 350 defining an axis of rotation parallel to the axis of rotation defined by the first roller 526. As the feed wire 504 moves over the third roller 530, the feed wire 504 may move through a third 180° bend.

In general, the first roller 526, the second roller 528, and the third roller 530 may each be submerged in a liquid activation metal (e.g., a liquid form of any one or more of the various different activation metals described herein) in the heated bath 506. Accordingly, as the feed wire 504 is bent as it moves along the path defined by the first roller 526, the second roller 528, and the third roller 530 in the heated bath 506, the liquid activation metal may penetrate the aluminum of the feed wire 504 to form an activated aluminum wire 502. More specifically, the arrangement of the first roller 526, the second roller 528, and the third roller 530 may continuously bend the feed wire 504 in three separate orthogonal directions to facilitate cold-working the entire volume of the feed wire 504 and, thus, reducing the likelihood of an unstrained zone along the feed wire 504. In turn, this may facilitate uniformly penetrating the liquid activation metal into the feed wire 504. The activated aluminum wire 502 may be directed from the heated bath 506 to an output roller 532, where the activated aluminum wire 502 may be directed to a spool or other equipment for post processing according to any one or more of the various different techniques described herein.

In certain implementations, the contact between the feed wire 504 and each of the first roller 526, the second roller 528, and the third roller 530 while submerged in a liquid activation metal in the heated bath may additionally, or alternatively, facilitate penetrating the liquid activation metal into the feed wire 504. For example, one or more of the first roller 526, the second roller 528, or the third roller 530 may assist in wetting the heated liquid metal to the surface of the feed wire 504 in the heated bath 506. For example, one or more of the first roller 526, the second roller 528, and the third roller 530 may have a recessed half-round profile with near the same radius as the wire so that the liquid activation metal trapped between the respective roller and the feed wire 504 may be forced to wet the feed wire 504. Additionally, or alternatively, one or more of the first roller 526, the second roller 528, or the third roller 530 may include meshed gears to facilitate moving the feed wire 504 and the activated aluminum wire 502 along forced input and output paths with substantially equal velocity (e.g., varying by less than 1 percent).

While paths for movement of feed wires have been described as moving in a single direction through a heated bath containing liquid activated metal, it shall be appreciated that any one or more of the various different feed wires described herein may be additionally or alternatively moved back and forth through the heated bath multiple times.

In certain instances, the system 500 may include a housing 534, which may support shafts of any one or more of the first roller 526, the second roller 528, and the third roller 530. Further, or instead, it shall be appreciated that the various different elements of the system 500 may be formed of a high temperature plastic or a stainless steel, as is useful for withstanding corrosion by the liquid activation metal in the heated bath 506.

Having described various aspects of continuously forming activated aluminum with efficient use of activation metal, attention is now turned to techniques for efficiently using activation metal to form activated aluminum in processes in which the aluminum feed material includes discrete bodies, such as may be common when the aluminum feed material is sourced as scrap.

Figure 6:
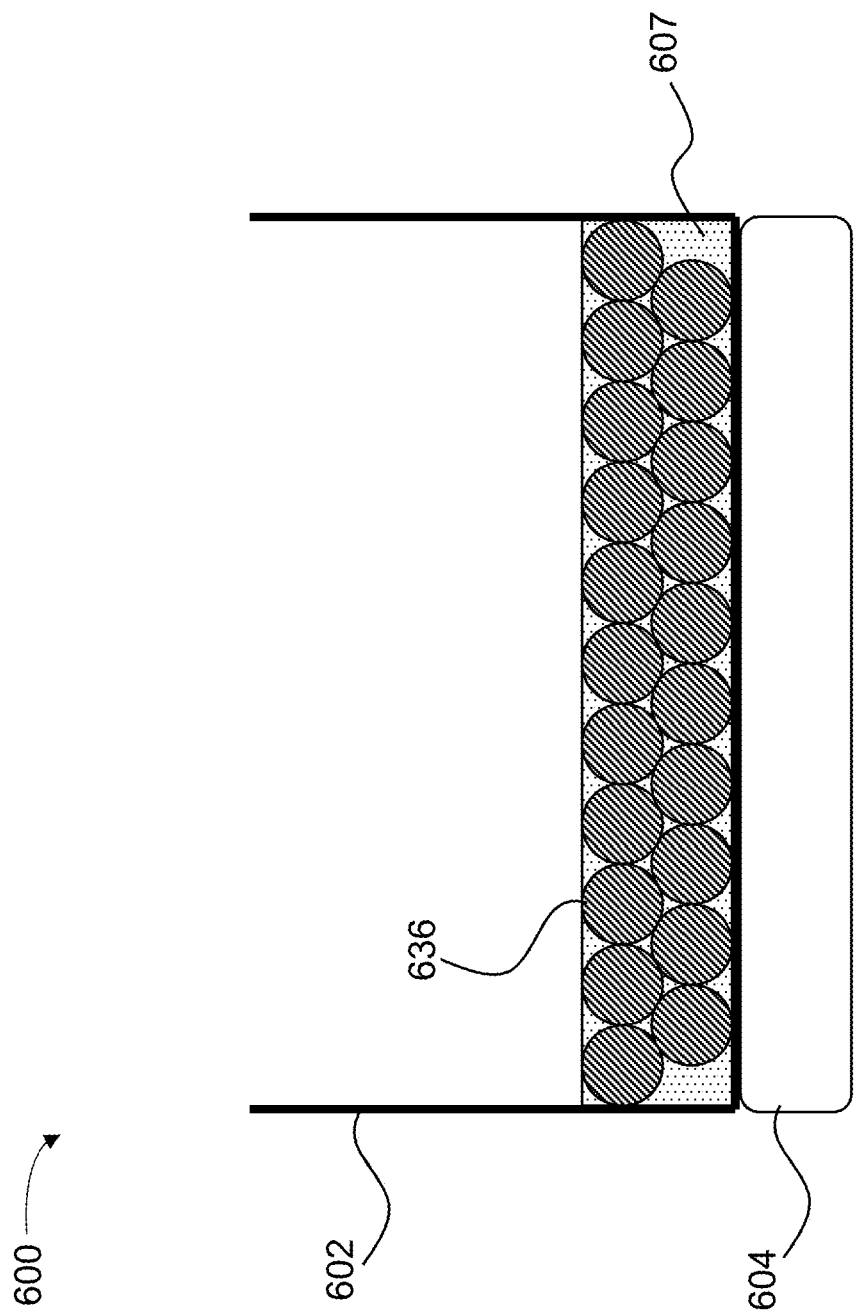
FIG. 6 is a schematic representation of a system for processing material for forming activated aluminum reactable with water to form hydrogen, the system including a vibration device.

Referring now to FIG. 6, a system 600 may include a container 602 mounted on a vibration device 604. In use, the container 602 may contain a liquid activation metal 607 and discrete bodies 636 containing aluminum, and the vibration device 604 may be operable to vibrate (e.g., sonic vibration) the container 602 randomly along and or about one or more axes and the contents of the container to facilitate penetration of the liquid activation metal 607 into the aluminum of the discrete bodies 636 to form activated aluminum. More specifically, as the discrete bodies 636 collide with each other as a result of vibration of the container 602, microcracks may form on the surfaces of the discrete bodies 636 due to high contact stresses (e.g., Hertzian). As compared to exposure of the discrete bodies 636 to the liquid activation metal 607 without the vibration, it is believed that the liquid activation metal 607 may be able to penetrate more of the grain boundaries of the discrete bodies 636. In turn, this may reduce the amount of the liquid activation metal 607 required to form activated aluminum from the discrete bodies 636.

In certain instances, the frequency of vibration of the container 602 by the vibration device 604 may be controlled match the natural frequency of each instance of the discrete bodies 636 (e.g., in the case in which the discrete bodies 636 have substantially uniform shapes) or to match the natural frequency of the discrete bodies 636 collectively. Further or instead, vibration energy from the vibration device 604 may create waves in the liquid activation metal 607 and also in the discrete bodies 636, thus creating a fluidized bed of spheres. To accomplish this, the container 602 with the liquid activation metal 607 and the discrete bodies 636 therein may have an accelerometer attached to it. With the container 602 on the vibration device 604, the vibration frequency of the vibration device 604 may be varied at constant amplitude until the accelerometer signal peaks, indicating resonance has been achieved for the container 602 with the liquid activation metal 607 and the discrete bodies 636 therein.

While the discrete bodies 636 may be submerged in the liquid activation metal 607, it shall be appreciated that heating and maintaining such an amount of liquid activation metal 607 at elevated temperatures may require significant energy. Thus, while the discrete bodies 636 are shown as submerged in the liquid activation metal 607, it shall be appreciated that the discrete bodies 636 may be exposed only to a wetted coating of the liquid activation metal 607. In some instances, the discrete bodies 636 may be vibrated prior to being coated with the liquid activation metal 607 and/or after being coated with the liquid activation metal 607. As the discrete bodies 636 collide with each other as a result of the vibrations, microcracks may form on the surface of the discrete bodies 636 and the liquid activation metal 607 coated on the discrete bodies 636 may penetrate the bulk volume of the discrete bodies 636.

While vibration may be useful for promoting penetration of the liquid activation metal 607 metal into the discrete bodies 636, it shall be appreciated that other techniques may be additionally or alternatively used to facilitate efficient penetration of the liquid activation metal 607 into the discrete bodies 636 to form activated aluminum. For example, the discrete bodies 636 may be cryogenically treated prior to be being submerged in the liquid activation metal 607, which is heated. Continuing with this example, the difference in temperature between the discrete bodies 636 and the liquid activation metal 607 may thermally shock the discrete bodies 636 and, thus, disrupt the protective aluminum oxide on the aluminum of the discrete bodies 636.

As compared to techniques carried out without such thermal shock, it may cause disruption of the aluminum oxide layer which may facilitate better penetration of the liquid activation metal 607 into the bulk volume of the discrete bodies 636.

In certain implementations, the combination of thermal shock and vibration will create additional cracking and fracturing of the oxide layer, allowing for more liquid metal diffusion into the aluminum grain boundaries. Since these methods aid in liquid metal diffusion, potentially less treatment time is required as more liquid metal can enter initially into the bulk of the aluminum via fresh cracks and fractures created in the oxide layer. Thus, the aluminum will be exposed to less excess liquid metal resulting in less corrosion of the surface and thus less wetted surface area for the liquid metal to remain on after removal processes.

Having mentioned the compatibility of various aspects of the objects, systems, and methods described herein with the use of scrap, attention is now directed to describing specific techniques that may be used to form activated aluminum from electrical conductor (EC) wire scrap. Such EC wire is ubiquitous and, therefore, may form an abundant source of aluminum alloy usable in any one or more of the various different techniques described herein.

Figure 7:
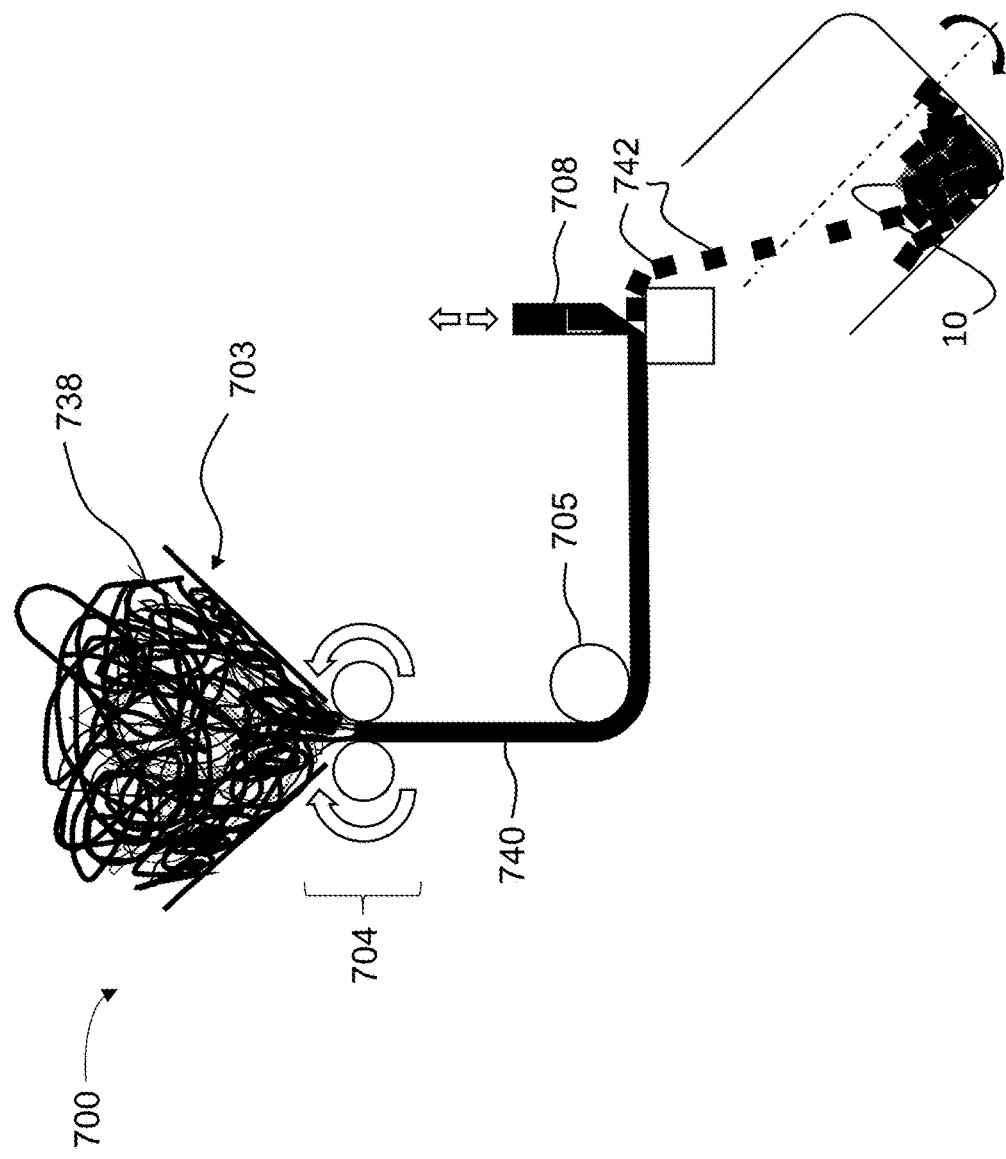
FIG. 7 is a schematic representation of a system for processing electrical conductor wire into activate aluminum reactable with water to form hydrogen, the system including a rolling mill.

Referring now to FIG. 7, a system 700 may include a hopper 703, a rolling mill 704, a roller 705, and a shear 708. In use, EC wire 738 may be fed into the hopper 703 and then forced (e.g., by a conveyor, screw or rollers) into the rolling mill 704. The rolling mill 704 may produce a sheet 740 having a constant thickness. The sheet 740 may be bend around the roller 705 to further cold-work the aluminum in the sheet 740 before the sheet 740 is moved through the shear 708, where the sheet 740 may be cut into pieces 742. In turn, the pieces 742 may be used as any one or more of the first articles used herein to form a composite object energizable on-demand to form activated aluminum. Additionally, or alternatively, the pieces 742 may be penetrated by any one or more of the liquid activation metals described herein to form activated aluminum. Still further, or instead, it shall be appreciated that, once treated, the pieces 742 may be stored and/or further shaped (e.g., cut) to sizes suitable for a particular application.

Figure 8:
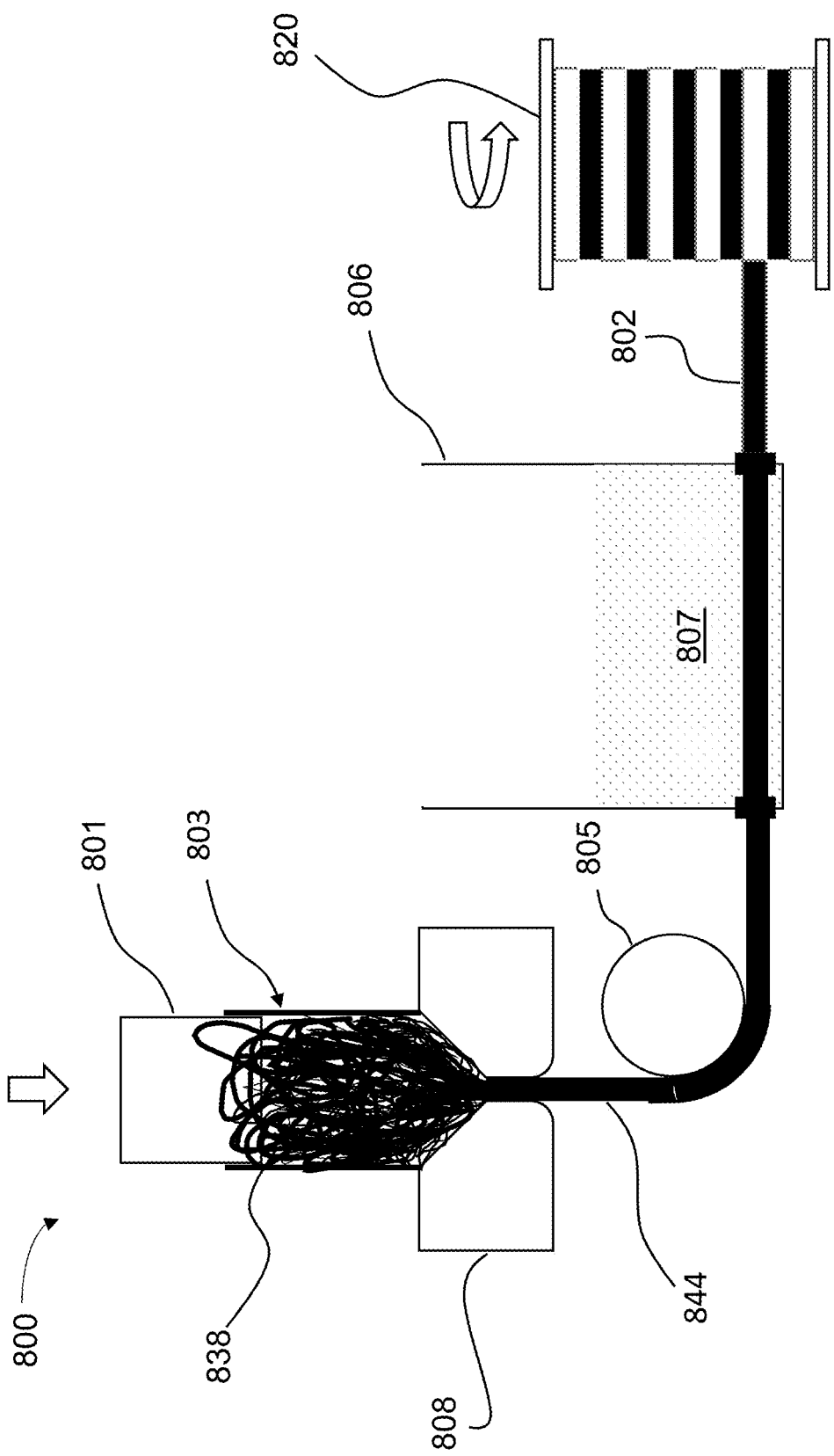
FIG. 8 is a schematic representation of a system for processing electrical conductor wire into activate aluminum reactable with water to form hydrogen, the system including a die.

Referring now to FIG. 8, a system 800 may include a hopper 803, a ram 801, a roller 805, a heated bath 806, and a die 808. In use, the heated bath 806 may contain a liquid activation metal 807. EC wire 838 may be positioned in the hopper 803, and the ram 801 may move toward the die 808 to extrude the EC wire 838 through the die 808 to produce a wire 844. The wire 844 may be fed around the roller 805 to further cold-work aluminum in the wire 844. In certain instances, the wire 844 may be fed into the liquid activation metal 807 in the heated bath 806, where the liquid activation metal 807 may penetrate the wire 844 to form an activated aluminum wire 802 that may then be wound onto a spool 820.

While EC wire has been described as being processed via roll milling and/or extrusion. It shall be appreciated that any one or more of various different other processes that advantageously cold-work the EC wire may be additionally or alternatively used. For example, in some cases, the EC wire may be cold-forged with a press into a constant thickness shape and, additionally, or alternatively placed in a container to be treated with liquid activation metal to form activated metal.

In some instances, the EC wire may be placed inside of a drum with a liquid activation metal then rotated about various axes to facilitate wetting all surfaces of the EC wire with the liquid activation metal. In some instances, the container may be used to form activated aluminum and, further or instead, may be used to transport the activated aluminum to an end-use application. such as a Ga—In eutectic, and the drum is then rotated about various axes so the liquid metal can wet the all the wire surface, thus the drum itself can act as the treatment container, reaction vessel, and reacted byproduct return container.

The above systems, devices, methods, processes, and the like may be realized in hardware, software, or any combination of these suitable for the control, data acquisition, and data processing described herein. This includes realization in one or more microprocessors, microcontrollers, embedded microcontrollers, programmable digital signal processors or other programmable devices or processing circuitry, along with internal and/or external memory. This may also, or instead, include one or more application specific integrated circuits, programmable gate arrays, programmable array logic components, or any other device or devices that may be configured to process electronic signals. It will further be appreciated that a realization of the processes or devices described above may include computer-executable code created using a structured programming language such as C, an object oriented programming language such as C++, or any other high-level or low-level programming language (including assembly languages, hardware description languages, and database programming languages and technologies) that may be stored, compiled or interpreted to run on one of the above devices, as well as heterogeneous combinations of processors, processor architectures, or combinations of different hardware and software. At the same time, processing may be distributed across devices such as the various systems described above, or all of the functionality may be integrated into a dedicated, standalone device. All such permutations and combinations are intended to fall within the scope of the present disclosure.

Embodiments disclosed herein may include computer program products comprising computer-executable code or computer-usable code that, when executing on one or more computing devices, performs any and/or all of the steps of the control systems described above. The code may be stored in a non-transitory fashion in a computer memory, which may be a memory from which the program executes (such as random access memory associated with a processor), or a storage device such as a disk drive, flash memory or any other optical, electromagnetic, magnetic, infrared or other device or combination of devices. In another aspect, any of the control systems described above may be embodied in any suitable transmission or propagation medium carrying computer-executable code and/or any inputs or outputs from same.

The method steps of the implementations described herein are intended to include any suitable method of causing such method steps to be performed, consistent with the patentability of the following claims, unless a different meaning is expressly provided or otherwise clear from the context. So, for example performing the step of X includes any suitable method for causing another party such as a remote user, a remote processing resource (e.g., a server or cloud computer) or a machine to perform the step of X. Similarly, performing steps X, Y and Z may include any method of directing or controlling any combination of such other individuals or resources to perform steps X, Y and Z to obtain the benefit of such steps. Thus, method steps of the implementations described herein are intended to include any suitable method of causing one or more other parties or entities to perform the steps, consistent with the patentability of the following claims, unless a different meaning is expressly provided or otherwise clear from the context. Such parties or entities need not be under the direction or control of any other party or entity, and need not be located within a particular jurisdiction.

It will be appreciated that the methods and systems described above are set forth by way of example and not of limitation. Numerous variations, additions, omissions, and other modifications will be apparent to one of ordinary skill in the art. In addition, the order or presentation of method steps in the description and drawings above is not intended to require this order of performing the recited steps unless a particular order is expressly required or otherwise clear from the context. Thus, while particular embodiments have been shown and described, it will be apparent to those skilled in the art that various changes and modifications in form and details may be made therein without departing from the scope of the disclosure.

What is claimed is:

1. A method of processing material for forming activated aluminum reactable with water to produce hydrogen, the method comprising:
    positioning a first article in contact with a second article, the first article including an aluminum alloy, the second article including an activation metal, and the aluminum alloy is corrodible by the activation metal; and
    cold-working the first article and the second article together with one another to form a composite object including the aluminum alloy in a first portion and the activation metal in a second portion, wherein the activation metal of the second portion is energizable to penetrate into a cold-worked non-recrystallized grain structure of the aluminum alloy of the first portion, wherein cold-working the first article and the second article together with one another forms at least about 20 percent plastic strain in the aluminum alloy of the first portion of the composite object.

2. The method of claim 1, wherein cold-working the first article and the second article together includes moving the first article and the second article together through an extruder.

3. The method of claim 1, wherein cold-working the first article and the second article together includes cold rolling, forging, swaging, torsional winding, or a combination thereof.

4. The method of claim 1, wherein the first article is a rod and the second article is a coating applied to the rod.

5. The method of claim 1, wherein the composite object is porous.

6. The method of claim 1, wherein the composite object formed from cold-working the first article and the second article together is in the form of a wire.

7. The method of claim 6, wherein cold-working the first article and the second article together includes spooling the wire.

8. The method of claim 7, further comprising spinning the wire in the spooled form, with centrifugal force removing excess activation metal from the composite object.

9. The method of claim 6, wherein cold-working the first article and the second article together to form the composite object includes cutting the wire into discrete pieces.

10. A method of processing material for forming activated aluminum reactable with water to produce hydrogen, the method comprising:
    positioning a first article in contact with a second article, the first article including an aluminum alloy, the second article including an activation metal, and the aluminum alloy is corrodible by the activation metal; and
    cold-working the first article and the second article together with one another to form a composite object including the aluminum alloy in a first portion and the activation metal in a second portion, wherein the activation metal of the second portion is energizable to penetrate into a cold-worked non-recrystallized grain structure of the aluminum alloy of the first portion, wherein the first article is a first filament and the second article is a second filament, and cold-working the first article and the second article includes forming the composite object as one or more of a twist, a braid, or wire wool including the first filament and the second filament.

11. A method of processing material for forming activated aluminum reactable with water to produce hydrogen, the method comprising:
    positioning a first article in contact with a second article, the first article including an aluminum alloy, the second article including an activation metal, and the aluminum alloy is corrodible by the activation metal;
    cold-working the first article and the second article together with one another to form a composite object including the aluminum alloy in a first portion and the activation metal in a second portion, wherein the activation metal of the second portion is energizable to penetrate into a cold-worked non-recrystallized grain structure of the aluminum alloy of the first portion; and
    energizing the composite object to penetrate at least a portion of the activation metal from the second portion of the composite object into a grain structure of the aluminum alloy in the first portion of the composite object to form activated aluminum.

12. The method of claim 11, wherein energizing the composite object includes heating the composite object to a temperature greater than a melt temperature of the activation metal in the second portion of the composite object and below a recrystallization temperature of the aluminum alloy in the first portion of the composite object.

13. The method of claim 11, wherein energizing the composite object includes applying pressure to the composite object.

14. The method of claim 11, wherein energizing the composite object includes vibrating the composite object.

15. The method of claim 14, wherein vibrating the composite object includes vibrating the composite object at a natural frequency of the composite object.

* * * * *